Nov. 6, 1962
M. LUBIN
3,062,964
OPTICAL SYSTEMS FOR PHOTOCELLS
Filed Sept. 17, 1956
3 Sheets-Sheet 2
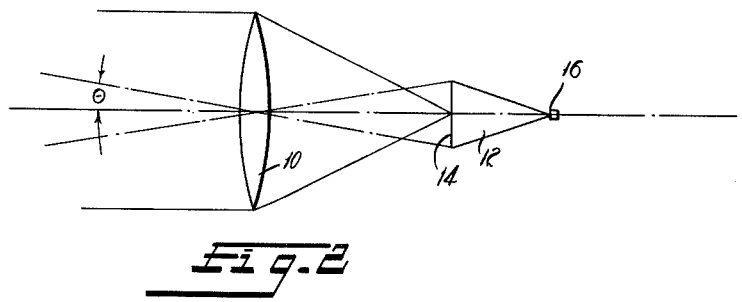
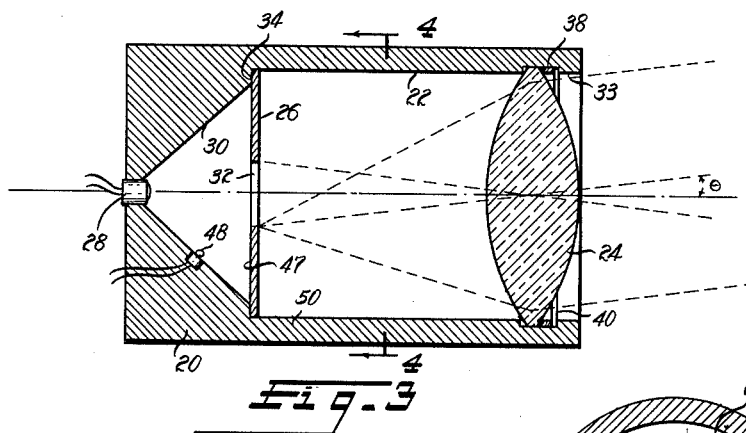
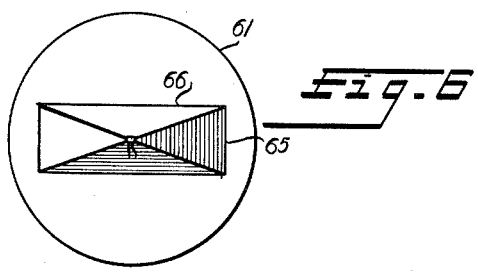
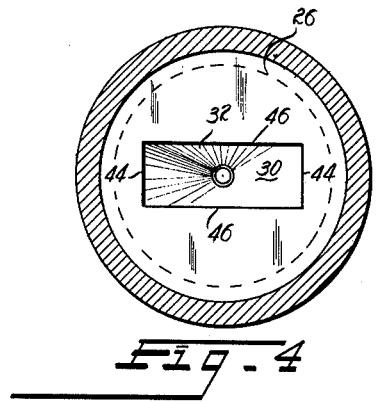
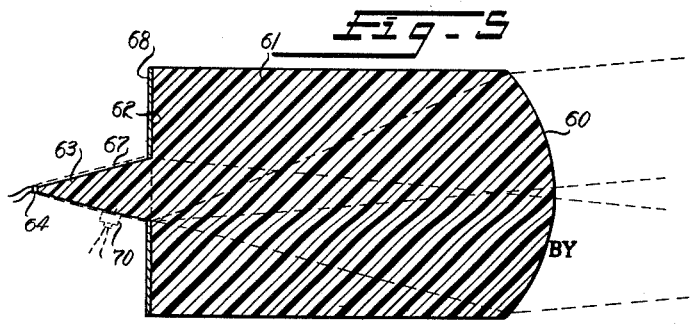
INVENTOR
MARVIN LUBIN
BY
ATTORNEYS Nov. 6, 1962 M. LUBIN 3,062,964
OPTICAL SYSTEMS FOR PHOTOCELLS
Filed Sept. 17, 1956 3 Sheets-Sheet 3

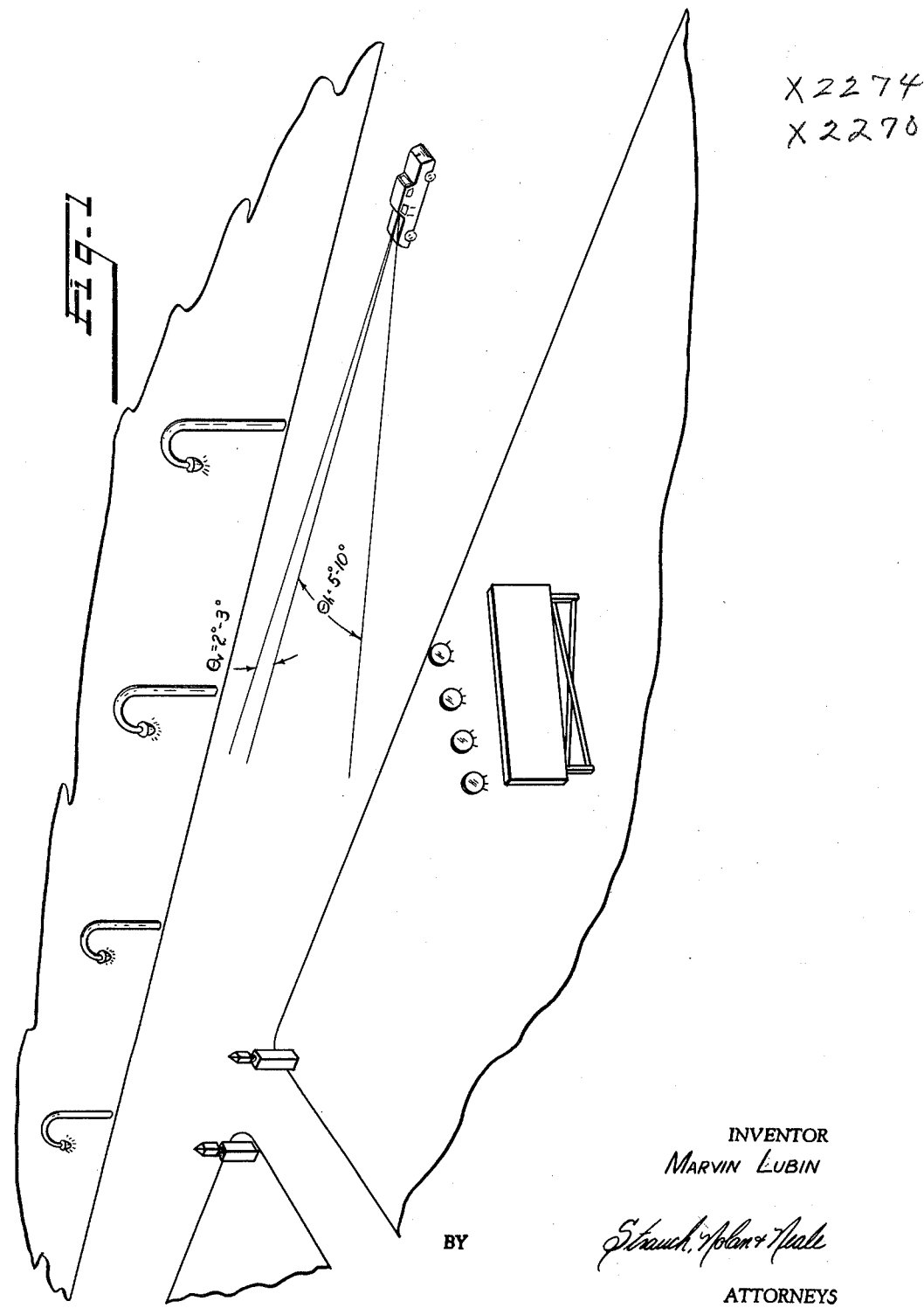

INVENTOR
MARVIN LUBIN

Strauch, Nolan & Neale
ATTORNEYS

United States Patent Office 3,062,964
Patented Nov. 6, 1962

3,062,964
OPTICAL SYSTEMS FOR PHOTOCELLS
Marvin Lubin, Forest Park, Ill., assignor to Hupp Corporation, Detroit, Mich., a corporation of Virginia
Filed Sept. 17, 1956, Ser. No. 610,214
23 Claims. (Cl. 250—227)

This invention relates to optical systems for use with photocells and more particularly to optical systems especially adapted for use with automatic headlight dimming apparatus in an automobile.

One of the basic problems in providing a system for automatically operating the headlight dimming equipment on an automobile is due to the large number of light sources encountered during night driving. While in most cases the brightest lights encountered are the headlights of an oncoming automobile to which the dimming equipment is to be responsive, many roadside light sources provide an illumination of the same general level of intensity as that provided by the headlights of an oncoming car at the distance where it is desired, or legally required in some states, for the lights to be dimmed. The solution to this problem therefore is not merely a matter of adjusting the sensitivity of the dimming apparatus.

Many of the light sources that cause undesired dimming action in automatic headlight systems are caused by overhead road lighting, reflections from the road and advertising sign boards and highway signs that are either illuminated or highly reflecting. Prior systems have relied primarily on the relative weakness of these undesired sources and special shielding for preventing undesired operation of the dimming equipment, though a limited amount of shielding has been provided by an ordinary lens and housing. However since with ordinary lens the size of the field or area from which light sources can illuminate the photocell increases with an increase in distance from the automobile, construction of an optical system which will ignore light from all sources that are above or to either side of the road and still be responsive to light from a headlight from an oncoming automobile up to the point where the automobiles meet poses many problems. The conically shaped light sensitive fields provided by the usual spherical lens has the disadvantage that overhead lights which are the closest to the automobile of the sources from which light is to be excluded have intensities approaching the intensity of the headlights of oncoming cars at the distance where the headlights should be dimmed. The optical system for the headlight dimmer must have a field of light acceptance large enough so that light from the oncoming automobile will be effective until the automobiles almost meet so that the bright lights of the auto containing the automatic dimming apparatus are not turned on before the oncoming vehicle has passed.

I have found that effective headlight dimmer operation is provided without the need of special shielding to exclude the effects of extraneous light sources under night driving conditions on modern highways by utilizing a novel lens system which allows the vertical acceptance angle to be less than the horizontal acceptance and the size of both to be accurately controlled.

It is accordingly a major object of this invention to provide a novel optical system for headlight dimming apparatus which has different acceptance angles in the horizontal and vertical planes extending in front of the automobile where by satisfactory dimming operation is provided without the need of special shielding.

Another object of the invention is to provide a novel system wherein the horizontal and vertical acceptance angles are so related with each other and with the sensitivity of the dimming apparatus to produce minimum dimming action due to light from sources other than oncoming automobiles.

Still another object of this invention is to provide a novel optical system wherein the acceptance angle in one plane is significantly larger than the acceptance angle in an angularly related plane.

A further object of the invention is to provide a novel lens system having a controlled stop at the focal point for preventing reception of light from sources outside the desired field of view of the optical system and including a light pipe for guiding the light from the stop to the photocell.

Still another object of the invention is to provide for a photocell having a predetermined size light sensitive area, a novel lens system which utilizes the light sensitive area in conjunction with the focal length of two lenses having a common focal plane for providing a different acceptance angle in each of two angularly related planes.

Still a further object of the invention is to provide a novel optical system for a photocell having crossed cylindrical lenses of different focal length as boundary surfaces on a block of clear transparent plastic material.

Another object of the invention is to provide a novel optical system having different angles of acceptance in angularly related planes with the photocell located on the optical axis which extends outside of the image forming components of optical system.

These and other objects, features and advantages of the invention will become more fully apparent by reference to the appended claims and the following detailed description when read in conjunction with the accompanying drawings, wherein:

FIGURE 1 is a view illustrating diagrammatically the desired sensitive field of the headlight dimming system;

FIGURE 2 shows diagrammatically one photocell optical system capable of providing the desired sensitive field in accordance with the invention;

FIGURE 3 is a longitudinal section of one form of photocell mount embodying the optical system of FIGURE 2;

FIGURE 4 is a section taken on the line 4—4 in FIGURE 3;

FIGURE 5 is a longitudinal section of an alternative form of photocell mount also embodying the optical system as illustrated by FIGURE 2;

FIGURE 6 is a left end view of FIGURE 5;

Figure 7:
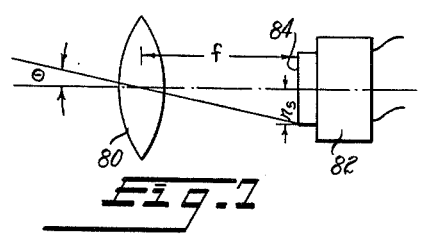
FIGURE 7 shows diagrammatically the principles of a second type of optical system which provides the desired optical characteristics in accordance with the invention.

Referring now to FIGURE 1 there is illustrated pictorially the field of view to which the headlight dimming apparatus is responsive in accordance with the invention.

For automatic headlight dimmer use, an optical system using a small photosensitive element of cadmium sulfide or the like must meet two very important requirements. These requirements, fully explained hereinafter are (1) that it provide adequate optical gain, and (2) that the acceptance angle in both vertical and horizontal directions be accurately limited so as to exclude light from sources outside the desired field.

By optical gain is meant the ratio between the amount of light which must be incident upon the unit to cause a photoelectric response adequate for dimmer operation in the absence of any optical system, to the amount of light which must be incident upon the unit to produce the same operation with the optical system present. The optical gain that is necessary in the headlight dimmer system depends in part upon the sensitivity of the electrical system including the photocell and in general, this ratio should be in the range of 15 to 300. For optical systems of minimum size and cost, optical gains in the lower portion of this range as for example 15 to 25 are preferred. For satisfactory operation with lower optical gains, it is necessary that the light incident on the system from the desired field of view be collected and directed onto the photoelement without significant loss.

By acceptance angle is meant the maximum angle with the axis of the lens through which parallel light rays may vary and still be incident on the photocell. Only those rays making an angle with the optical axis which is equal to or less than the acceptance angle are to reach the photoelement, while all rays making greater angles are to be excluded therefrom. In effect, then, the field of view of the photosensitive element and thus the headlight dimming system is restricted by its acceptance angles in the vertical and horizontal planes.

Various forms of the optical systems described below having different acceptance angles and different optical gains have been road tested for the purpose of determining what acceptance angles and optical gains will give reliable operation under the desired conditions and operate only a minimum amount due to roadside sources of illumination. Lens systems having low optical gains are preferred because their smaller size requires less space in the automobile and the cost of manufacture is less not only because of their smaller size but because the shape of the lens surfaces is less critical and can have larger tolerances. A lens system having an optical gain in the range of about 15 to 25 has been found to give good dimmer operation with photocells of cadmium sulphide or other photosenstive cells having similar properties.

It has been found that the upper vertical acceptance angle $\theta_v$ as shown in FIGURE 1 can be very small because the headlights of an oncoming car are generally directed in the same horizontal plane when the cars are close enough together to require dimming of headlights. Thus it is possible to substantially eliminate dimming of the lights due to overhead road lighting by making the upper vertical acceptance angle in the range of 2° to 3° degrees as illustrated in FIGURE 1 and still provide satisfactory response to headlights from autos coming down a hill.

The lower vertical acceptance angle below the horizontal plane containing the axis of the optical system may be approximately the same size as the upper vertical acceptance angle since the primary controlling factor is to provide satisfactory sensitivity to light from autos which approach coming up a hill. The small angle prevents operation of the dimming apparatus due to reflection from the surface of the road close to the front of the vehicle in which the optical system is installed.

The horizontal acceptance angles must be considerably larger than the vertical acceptance angles because light from oncoming headlights must be received by the photocell from vehicles that are approaching on corners, and light must continue to be received until the approaching vehicles are sufficiently close together to prevent the headlight dimming apparatus from becoming de-energized and causing the bright lights to turn on before the oncoming car has passed by. The horizontal angle does not need to be 90° or even 45° when cadmium sulfide or similar photosensitive crystals are used because there is inherent with this type of crystal a small delay from the time that illumination is removed before its resistance increases to its steady dark value. Also there is a slight delay in the de-energization of the electrical circuit and the relay, all of which tend to reduce the required horizontal acceptance angle. It is desirable to have the horizontal acceptance angle as small as possible, consistent with the foregoing considerations, so that roadside illumination sources will be outside the field of the optical system as far ahead of the vehicle containing the optical system as possible. this, coupled with the relatively low light intensities of most roadside sources reduces undesired dimming of the headlights to a minimum. The horizontal acceptance angles $\theta_h$ to both the left and right of the vertical plane through the axis of the lens system have accordingly been found to give most satisfactory operation in the range of about 5° to 10° with the optimum angle being in the range of about 5°–6°. Actually the sensitivity and recovery time of the photocell has an important bearing on the size of the acceptance angles and selected crystals manufactured by the Hupp Electronics Corporation having maximum sensitivity permit the use of smaller acceptance angles, and generally give more satisfactory performance.

Referring now to FIGURE 2 there is shown in diagrammatic form a simple positive lens 10 which provides the required optical gain and includes means for sharply differentiating between incident light lying within the desired acceptance angle and that lying without. This differentiating means is in effect a stop or aperture which in this form of the invention is a truncated right rectangular prism 12 having base 14 located at the focal point of lens 10 and having its axis aligned with the axis of the lens. Prism 12 may be made of a transparent, water white, clear plastic material such as an acrylic, polyester or other plastic having a high index of refraction and terminates at its small end with a surface on which the photocell 16 is secured. Photocell 16 may be secured to the prism by a transparent cement or when the photocell takes the form of a slab of crystalline cadmium sulfide it may be set in the original casting of the prism if desired.

Light received parallel to the axis of lens 10 is focused at the center of base 14 of prism 12. Light energy received by lens 10 at an angle as shown by the angle $\theta$ with the axis of lens 10 will strike the edge of base 14 while light being received on lens 10 at an angle of greater than $\theta$ with the axis of the lens will fall outside the base of the prism.

It is extremely important for headlight dimming apparatus that light energy incident on lens 10 at an angle greater than the acceptance angle $\theta$ falls at some position other than on face 14. The optical system thus defines a specific field from which light energy can be received by the photosensitive element and provides an effective shield for preventing extraneous light from sources outside of the desired field from being received by photoelement 16. The required optical gain is supplied by the simple positive lens 10 and the system sharply distinguishes between incident light lying within the acceptance angle and that lying without the acceptance angle. By use of a rectangular base on prism 12, the acceptance angles $\theta$ in two mutually perpendicular planes may be made different with the tangent of the acceptance angle equal to one-half the length of the corresponding dimension in base 14. Photocell 16 is conveniently mounted near the apex end of prism 12 and because the effective field of view is controlled by the dimensions of base 14, the physical dimensions of the photocell do not affect the field of view of the optical system and photosensitive cells mounted in standard housings may thus be used.

One physical form my invention may take is shown in FIGURES 3 and 4. Housing 20 may be formed of any opaque material, metal, plastic or wood, and has a cylindrical bore 22 open at one end to receive a circular convex lens 24 and a light barrier member 26 located in the focal plane of lens 24. A small opening at the end opposite the lens end of the housing supports the light sensitive unit 28. Walls 30 of light reflecting material extend from light barrier member 26 and converge at photosensitive element 28 to form a conical light pipe. The walls of bore 22 and the surface of light barrier member 26 facing lens 24 are preferably made light absorbant as by being painted black to absorb any light which is not initially directed through opening 32.

Annular shoulder 33 formed on the lens end of housing 20 may be slotted at two diametrically located positions so that light barrier member 26 can be inserted edgewise into bore 22 and then twisted into position against pilot surface 34. Lens 24 is similarly inserted through the diametrically located slots, not shown, in shoulder 33 and rotated into position. Gasket 38 formed of a compressible material is next slipped into position adjacent lens 24 and the entire assembly held in position as by split ring washer 40.

The size and shape of opening 32 in barrier member 26 are determined by the focal length of lens 24 and the desired vertical and horizontal acceptance angles as discussed in connection with FIGURE 1. One half of the length of short sides 44 of opening 32 is calculated as the product of the focal length times the tangent of the vertical acceptance angle. One-half the length of the long sides 46 of opening is calculated as the product of the focal length times the tangent of the horizontal acceptance angle.

The hollow chamber formed by wall 30 provides a light pipe or transmitting path which performs the function of prism 12 of FIGURE 1. Since it is desirable that as much of the light as possible that passes through opening 32 of light barrier member 26 be directed to the light sensitive element, which for cadmium sulfide has a light sensitive area having approximately a quarter inch diameter of sensitive area, a reflective coating is preferably applied on walls 30 and surface 47 of barrier member 26.

In many headlight dimming systems a small holding light 48 is deemed desirable to increase the sensitivity of the system and also to prevent the photosensitive element from becoming de-energized when the lights of an on-coming car are dimmed immediately following the energization of the cell and to increase the delay in de-energization time. The auxiliary light socket may be cast or otherwise inserted in walls 30 of the chamber in which the photocell is located. Satisfactory holding operation is also obtained when the auxiliary light is located in the walls of the cylindrical chamber as at reference number 50.

The form of my invention illustrated in FIGURES 5 and 6 may be manufactured by casting the image forming component which includes the optical path and the prism or light pipe as one piece of acrylic, polyester or other plastic material having the desirable optical properties. Surface 60 is formed as the light gathering lens and is one surface of a cylindrical body 61 of the light transmitting material which provides the optical path from the lens to the focal point lying at the center of surface 62 located at the focal plane of lens 60. Light pipe 63 from the focal plane or surface 62 to the photosensitive element is in the form of a rectangular pyramid with photosensitive element 64 attached at the apex either by being embedded in the plastic material or secured thereto as with a transparent cement.

One-half the length of the short edges 65 of the base of pyramid 63 is again made equal to the product of the focal length times the tangent of the vertical acceptance angle and one-half the length of the longer edges 66 is similarly made equal to the product of the focal length times the tangent of the horizontal acceptance angle. The illumination from the desired limited field is thus supplied to the photosensitive element while light beyond the desired area is shielded from the photosensitive element.

To increase the efficiency in light transmission through pyramid 63, it has been found preferably to place a reflective coating 67 along the four sides of the pyramid. A light absorptive coating 68 is preferably used on end surface 62 to prevent light from outside the desired limited area from passing back into the region where the photosensitive element is located. An auxiliary holding light 70 may be optionally inserted either in the wall of pyramid 63 as illustrated or in body 61 as desired.

Another form of an optical system capable of providing the desired optical properties for a headlight dimmer comprises a system having two cylindrical lenses of different focal lengths having crossed axes. Referring now to FIGURE 7 for consideration of the principles involved, this system basically includes a first lens 80 having a focal length $f$ and a photocell 82 having its photosensitive surface located approximately in the focal plane. Surface 84 having a radius $r_s$ is the sensitive area of the photocell. The acceptance angle $\theta$ is related to the focal length and the radius $r_s$ of the sensitive area of the photocell by the equation $$\tan \theta = \frac{r_s}{f}$$

The size of the sensitive area of the photocell is determined by the exposed area of photosensitive material and the different acceptance angles $\theta$ can thus be obtained by using two or more lenses having different focal lengths but common focal planes as will now be explained.

Figure 8:
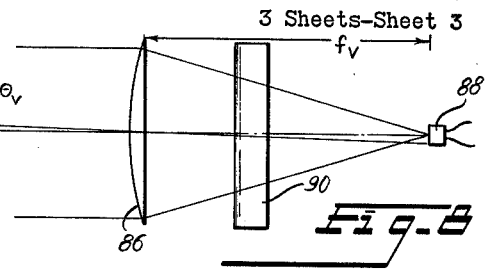
FIGURE 8 is a vertical view of one form of the invention utilizing the principles of FIGURE 7.
Figure 9:
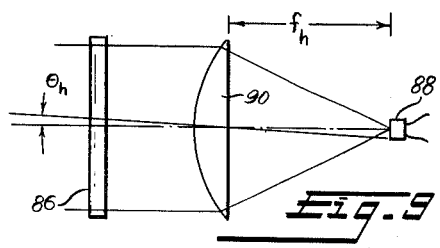
FIGURE 9 is a horizontal view of the optical system shown in FIGURE 8.

Referring now to FIGURES 8 and 9, FIGURE 8 is a view in elevation of a lens system according to my invention comprising lens 86 having focal length $f_v$ and a photocell 88 located in the focal plane with the center of the sensitive area of the photocell at the optical axis in the focal plane. Since for the reasons outlined above the vertical acceptance angle $\theta_v$ is to be in the range of about 2° to 3° and in optical systems using small bodies of photosensitive material, such as cadmium sulfide, as a photocell where the sensitive area is approximately one-quarter inch in diameter if round or having sides approximately one-quarter inch long if square, the focal length $f_v$ can be readily calculated. Since lens 86 is to control only the vertical acceptance angle, its curvature will be cylindrical and the plan view of this lens will appear rectangular as shown in FIGURE 9.

If the image on photocell 88 at the focal plane of lens 86 is examined, it will be found that the light is concentrated in the vertical direction but not in the horizontal direction. If lens 86 is filled with light parallel to its optical axis, the image will be a line whose horizontal length is the same as the horizontal dimension of the lens. If the vertical effective dimension of cylindrical lens 86 is one inch, for example, and the vertical width of the line image at photocell 88 is one-eighth inch, then an optical gain of eight has been realized. This is because all of the light parallel to the axis of lens 86 has been concentrated by lens 86 into an area one-eighth as large as the area of lens 86 upon which the light originally impinged.

The size of the horizontal acceptance angle is controlled by providing the proper focal length $f_h$ for lens 90. Since the active surface of the photocell is controlled in this embodiment by the dimensions of the photocell and assumed to be one-quarter inch in diameter, and the optimum value of the horizontal acceptance angles has, as discussed above, been found to be in the range of about 5° to 10°, the focal length $f_h$ of lens 90 can be readily determined by the same trignometric relationship as set forth above.

The function of the second cylindrical lens 90 whose axis is at an angle of 90° with respect to the axis of lens 86 is to shorten the horizontal length of the line having a one-eighth inch vertical height as described above. This is accomplished by the concentration effect on the light by lens 90 in the horizontal direction so the final image formed by both lens 86 and 90 will be a small rectangle.

If the horizontal length of the line formed by lens 86 is one inch as assumed above, and the length of this line is shortened in the horizontal direction by lens 90 to one-eighth inch, then a second gain of eight has been realized. It is thus apparent that in a system using two cylindrical lenses whose axes are at right angles and aligned optically as shown in FIGURES 8 and 9, the focusing action of each lens is limited to one dimension thereby permitting independent control of the horizontal and vertical acceptance angles. The optical gain of the system as, described above is the product of the optical gain of each lens since all the light originally impinging on a 1 inch square lens as assumed above is concentrated into a ⅛ inch square having only 1/64 the area of the light receiving area of the lens. Neglecting absorption in the lens and imperfect focusing, for which allowances can be made, the total optical gain $g_t$ using a pair of crossed cylindrical lens may be expressed mathematically as the product of the individual gains in the vertical $g_v$ and horizontal $g_h$ planes, $$g_t = \frac{dl_v}{ds} \cdot \frac{dl_h}{ds}$$

where $dl_v$ and $dl_h$ are the effective dimension of the two lenses and $ds$ is the effective corresponding dimension of the focused image on the photocell. Since the effective size of both lens in the illustrated embodiment are equal, the total gain for circular lens may be written as $$g_t = \frac{dl^2}{ds^2}$$

where $dl$ is the diameter of the lens and $ds$ is the diameter of the sensitive area of the photocell. Thus for a given sensitive area on the photocell and given gain, the required lens diameter $dl$ may be determined by $$dl = \frac{ds}{gl}$$

Figure 10:
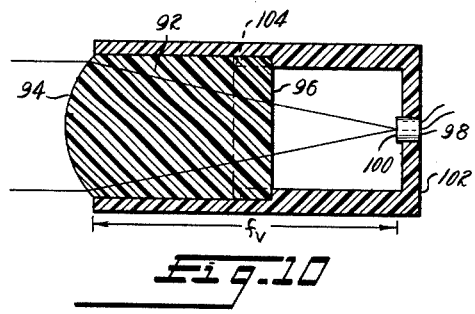
FIGURES 10 and 11 are vertical and horizontal views in section respectively of a preferred embodiment utilizing the principles of the optical system of FIGURE 7.
Figure 11:
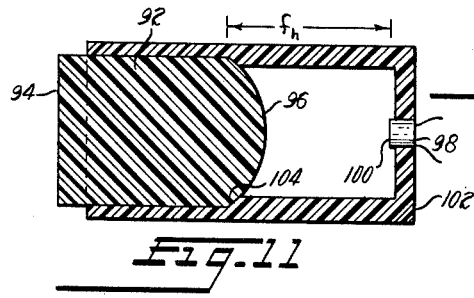

While the two separate cylindrically shaped lenses 86 and 90 of FIGURES 8 and 9 could be located in a hollow housing such as shown in FIGURES 3 and 4, a preferred embodiment utilizing the principles described in FIGURES 8 and 9 is shown in FIGURES 10 and 11. The two lenses are formed as boundary surfaces on a single block 92 of clear transparent plastic material, the front lens surface 94 determining the acceptance angle in the vertical plane and the rear lens surface 96 determining the acceptance angle in the horizontal plane. Photocell 98 has its photosensitive surface 100 located in the common focal plane of both lenses and is held in this position as by a hollow container 102 preferably made of an opaque material.

The block of transparent material may be inserted in the open end of container 102 and accurately positioned with respect to the sensitive surface of photocell 98 as by shoulder 104. The inside surface of the container 102 is preferably formed to be light absorbing to reduce the effect of light from sources outside the desired field of view defined by the horizontal and vertical acceptance angles on sensitive surface 100 of photocell 98. The cross section of container 102 and body 92 need not be circular as square, rectangular or other polygonal cross sections are satisfactory.

In some installations it has been found desirable to reduce the overall length of the optical system to provide a greater latitude in chosing the optimum location of the photocell and lens system on the automobile and at the same time keep the photocell positioned out of the light path in the optical system to avoid an arrangement where shadows are caused by the photocell. The embodiment shown in FIGURES 12 and 13 includes a totally reflecting surface 110 which causes the optical axis of the system to be folded at an angle. The image forming components of the optical system in this embodiment include lens 112, the focal length of which determines the vertical acceptance angle and lens 114, the focal length of which determines the horizontal acceptance angle. Photocell 116 is mounted so that light sensitive surface 118 is in the common focal plane of both lens 112 and 114. The light sensitive surface 118 of photocell 116 is located the same distance from point 120 on reflecting surface 110 as is the virtual focal point 122 of lens 112.

All of the image forming components of the optical system are preferably cast as a single integral body with the locations of lens surfaces 112 and 114 and the reflecting planar surface 110 accurately controlled by the mold. The optical axis may be folded at other than right angles if desired by locating surface 110 at an angle other than 45° with the axis of lens 112.

Housing or container 124 may be formed with suitable positioning surfaces 126 and 128 for proper orientation of the lens body or image forming components of the optical system with respect to the photocell and has a removable panel 130 which allows the lens body to be removably secured in the container. The lens body may thus be inserted into its desired position in housing 124 and panel 130 then secured to the housing as with screws 132. Housing 124 is preferably formed of an opaque material and coated with a light absorbing layer 134 on the interior surfaces of the chamber surrounding light sensitive 118 of the photocell.

Figure 14:
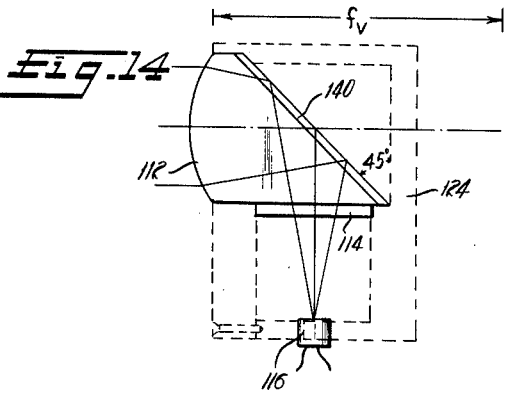
FIGURE 14 is a view similar to FIGURE 12 of a modified form of a lens system having a folded axis.
Figure 12:
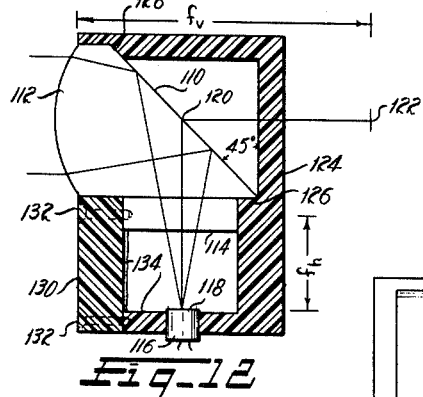
FIGURE 12 is a side view in section of a modification having a folded optical axis.
Figure 13:
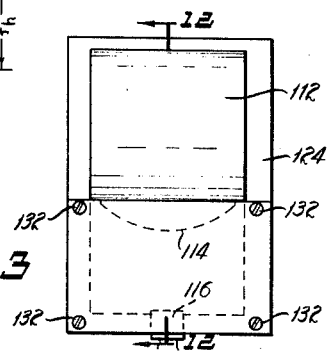
FIGURE 13 is a front view as seen looking toward lens 112 of FIGURE 12.

FIGURE 14 shows a further modification of the lens system of FIGURE 12 and 13. Since the structure is substantially identical, except as hereinafter discussed, with the embodiment shown in FIGURES 12 and 13, housing 124 is shown merely in dotted lines and the end view as seen looking in the direction of the axis of lens 112 is identical to FIGURE 13 with the exception of the degree of curvature of lens 114.

In the embodiment shown in FIGURE 14 reflecting surface 140 is curved rather than being a planar surface as shown in FIGURE 12. The curvature of surface 140 may be used to either augment the focusing function of one or both of lenses 112 and 114 or replace either lens. By making surface 140 spherical or quasispherical, the acceptance angles in both the horizontal and vertical planes will be augmented. If surface 140 is made cylindrical and having a horizontal axis, as illustrated, only the horizontal acceptance angle is affected. The curvature of surface 140 does not need to be limited to any one form as a suitable shape determined empirically for a specific type of installation may have a compound curvature.

It is thus apparent that there are a large number of different types and shapes of curvatures that surface 140 could assume and in conjunction with various lenses 112 and 114 produce an optical system having the desired field of view in accordance with the principles of my invention. It is also apparent that other types of housings or containers could be used for the image forming components of the optical system and photocell, and that photocells using sensitive materials other than cadmium sulfide could be used.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Patent is:

1. In combination, a photocell formed of a semiconductor material having a light sensitive area mounted in an optical system to be illuminated only by light received through said system, said optical system having an effective light receiving area at least 15 times larger than the light sensitive area of said photocell and comprising image forming components consisting solely of an integral body of a clear light conducting material for transmitting light rays parallel to and at small angles with the axis of said image forming components to the light sensitive area of said photocell, and means for directing light from sources of light located remote from said image receiving components within a preselected field from which said light rays are received to said photocell, said preselected field being defined by a pair of acceptance angles formed with the axis of said image forming components with each of said angles being of different magnitude and lying in planes perpendicular to said axis and perpendicular to each other.

2. The combination as defined in claim 1 wherein the light sensitive area of the photocell and the effective light receiving area of said optical system are related to provide an optical gain in the range of 15 to 25, the smaller of said pair of acceptance angles being in the range of 2° to 3° and oriented vertically, and the larger of said acceptance angles being in the range of 5° to 10° and oriented horizontally.

3. The combination as defined in claim 1 wherein said optical system further includes a light transmission path from the focal point of light gathering means to the photocell, said path having cross sectional dimensions at said focal point which provide an aperture of controlled size to define the different acceptance angles.

4. The combination as defined in claim 1 wherein said light directing means includes a light barrier member supported in the focal plane of light gathering means having a rectangular opening for passing light from sources in said predetermined field to said photocell.

5. The combination as defined in claim 4 wherein the light sensitive area of said photocell is smaller than the rectangular opening and the photocell is connected to the opening by a light pipe.

6. The combination as defined in claim 5 wherein the light pipe is formed of a transparent plastic material.

7. The combination as defined in claim 5 wherein the light pipe is enclosed by a wall of light reflecting material.

8. The combination as defined in claim 1 wherein said light directing means comprises a pair of spaced lenses on different sides of said integral body of light conducting material, each of said lenses being formed to concentrate light received by the lens along a line with both of said lines lying in the same focal plane, said lines being angularly related with each other and intersecting whereby light from light sources in said field is directed into an area of approximately the size of the light sensitive area of said photocell.

9. The combination as defined in claim 8 wherein the photocell is positioned at the intersection of said lines.

10. The combination as defined in claim 8 wherein said lenses are axially aligned.

11. The combination as defined in claim 8 wherein said lenses are separated optically by a reflecting surface directed at an oblique angle with respect to the optical axis of one of said lenses.

12. The combination as defined in claim 11 wherein said reflecting surface is planar.

13. The combination as defined in claim 11 wherein said reflecting surface is a curved surface.

14. The combination as defined in claim 8 wherein the light sensitive area of the photocell is symmetrical about the intersection of said focal lines and the distance between each lens and the focal plane is proportion to the tangent of its respective acceptance angle.

15. The combination as defined in claim 1 further including an auxiliary source of illumination in said system between said light gathering means and said photocell.

16. In combination, a semi-conductor light sensitive photocell, a housing, an optical image forming component carried by said housing comprising a light transmission region defined on two sides by cylindrically shaped walls, each of said cylindrically shaped walls forming a lens which concentrates light in only one dimension and having their axes angularly related, both of said cylindrically shaped walls having a common focal plane and one of said walls lying in the optical path between the other of said walls and said focal plane, said photocell being carried by said housing at the focal plane to receive the light directed to said focal plane by said component.

17. The combination as defined in claim 16 wherein the cylindrically shaped walls are on opposite sides of said region.

18. The combination as defined in claim 16 wherein the optical path between the other of said walls and the focal plane includes a light reflecting surface angularly disposed to the optical path to provide a folded optical path.

19. The combination as defined in claim 18 wherein the one of said walls lies between the light reflecting surface and the focal plane.

20. The combination as defined in claim 18 wherein the reflecting surface is curved.

21. The combination as defined in claim 18 wherein the reflecting surface is cylindrically shaped.

22. The combination as defined in claim 16 wherein said light transmission region is an integral body of transparent plastic material having said cylindrically shaped walls as boundary surfaces on said body.

23. An optical system for use in an automobile headlight dimmer comprising a housing member; image forming components having a pair of lens means effective in mutually exclusive perpendicular directions and having a common focal plane, supported by said housing; a photocell of a semiconductor material having a small light sensitive area supported by said housing at the focal plane of the image forming components; the effective light receiving area of said image forming components being at least 15 times as large as the light sensitive area of said photocell; said optical system including means limiting the field of view of the image forming components so as to prevent light from sources outside the field of view from impinging said photocell by controlling independently light acceptance angles in mutually perpendicular planes.

References Cited in the file of this patent

UNITED STATES PATENTS

| | | |
|---|---|---|
| 1,539,579 | Kucharski | May 26, 1925 |
| 1,771,844 | Eilenberg et al. | July 29, 1930 |
| 1,829,633 | Chretien | Oct. 27, 1931 |
| 1,896,830 | Scharff | Feb. 7, 1933 |
| 1,971,457 | Maurer | Aug. 28, 1934 |
| 2,064,987 | Reinhold et al. | Dec. 22, 1936 |
| 2,091,762 | Kuppenbender | Aug. 31, 1937 |
| 2,147,156 | Geffcken et al. | Feb. 14, 1939 |
| 2,182,987 | Hopkins | Dec. 12, 1939 |
| 2,226,677 | Vikhman | Dec. 31, 1940 |
| 2,303,113 | Eckel | Nov. 24, 1942 |
| 2,531,399 | Cawein et al. | Nov. 28, 1950 |
| 2,586,609 | Burke | Feb. 19, 1952 |
| 2,674,700 | Small | Apr. 6, 1954 |
| 2,695,964 | Schepker | Nov. 30, 1954 |
| 2,762,930 | Onksen et al. | Sept. 11, 1956 |
| 2,762,932 | Falge et al. | Sept. 11, 1956 |
| 2,771,594 | Gourdou | Nov. 20, 1956 |
| 2,848,651 | Byrne | Aug. 19, 1958 |
| 2,952,781 | Hersh | Sept. 13, 1960 |

FOREIGN PATENTS

| | | |
|---|---|---|
| 8,512 | Great Britain | Apr. 12, 1898 |